No. 845,689. PATENTED FEB. 26, 1907.
H. B. BUDDENBORG.
DREDGING APPARATUS.
APPLICATION FILED AUG. 10, 1904.

4 SHEETS—SHEET 2.

Witnesses
BM Offutt
Mary E. Moore

Inventor
Henry B. Buddenborg
By David S. Moore, Attorney

No. 845,689. PATENTED FEB. 26, 1907.
H. B. BUDDENBORG.
DREDGING APPARATUS.
APPLICATION FILED AUG. 10, 1904.
4 SHEETS—SHEET 3.
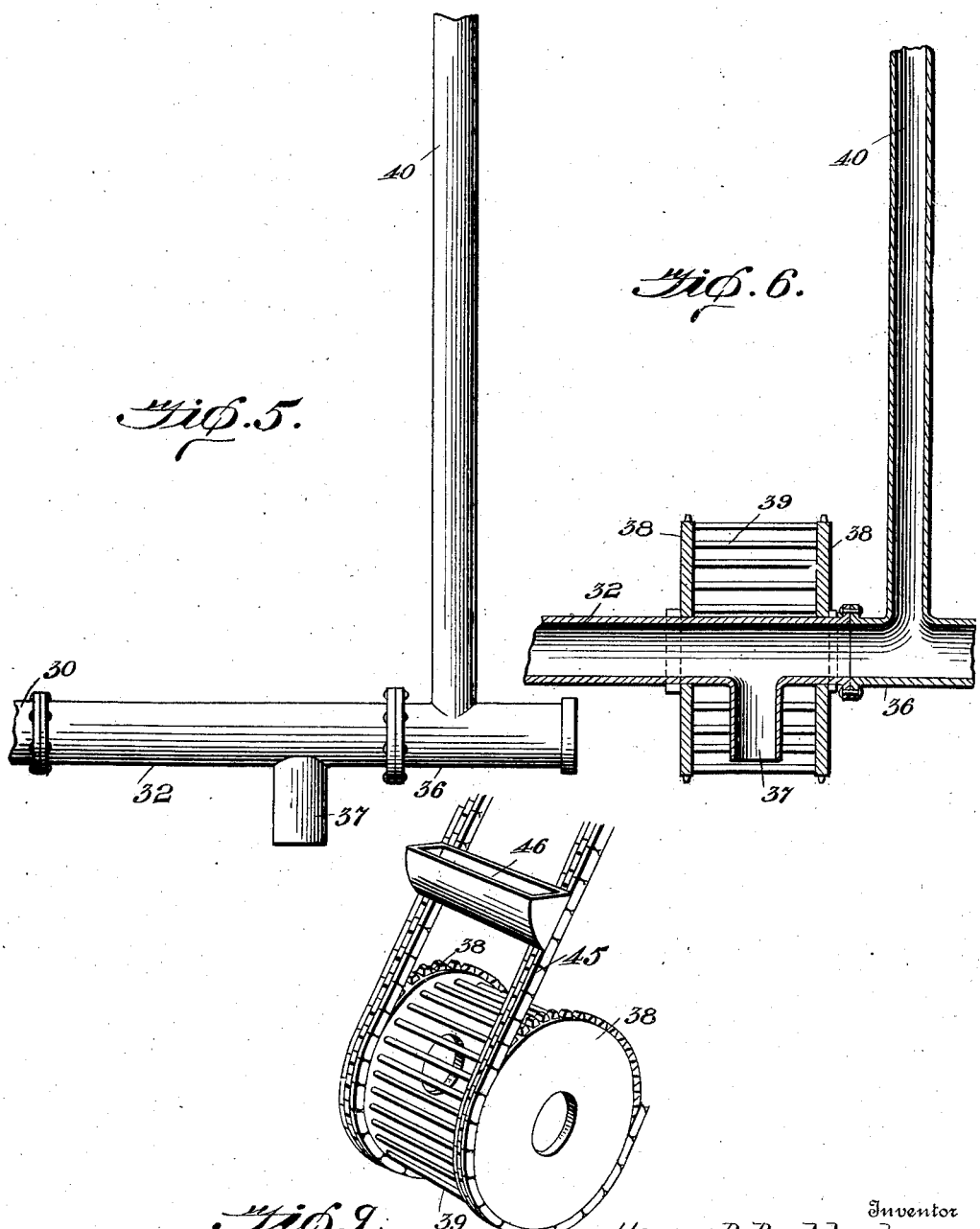

No. 845,689. PATENTED FEB. 26, 1907.
H. B. BUDDENBORG.
DREDGING APPARATUS.
APPLICATION FILED AUG. 10, 1904.
4 SHEETS—SHEET 4.
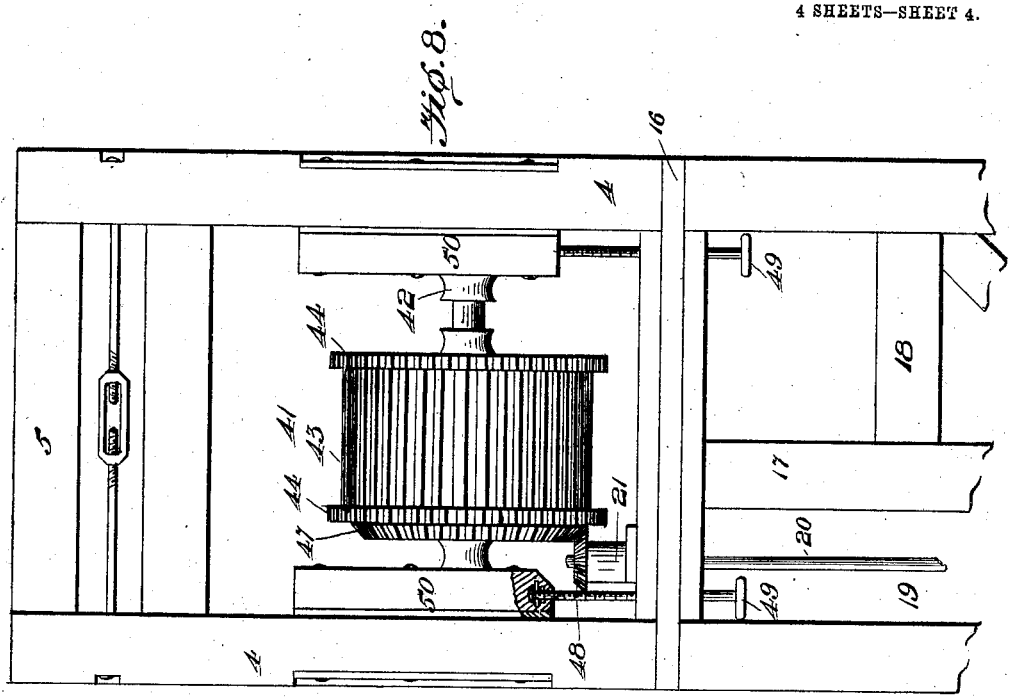
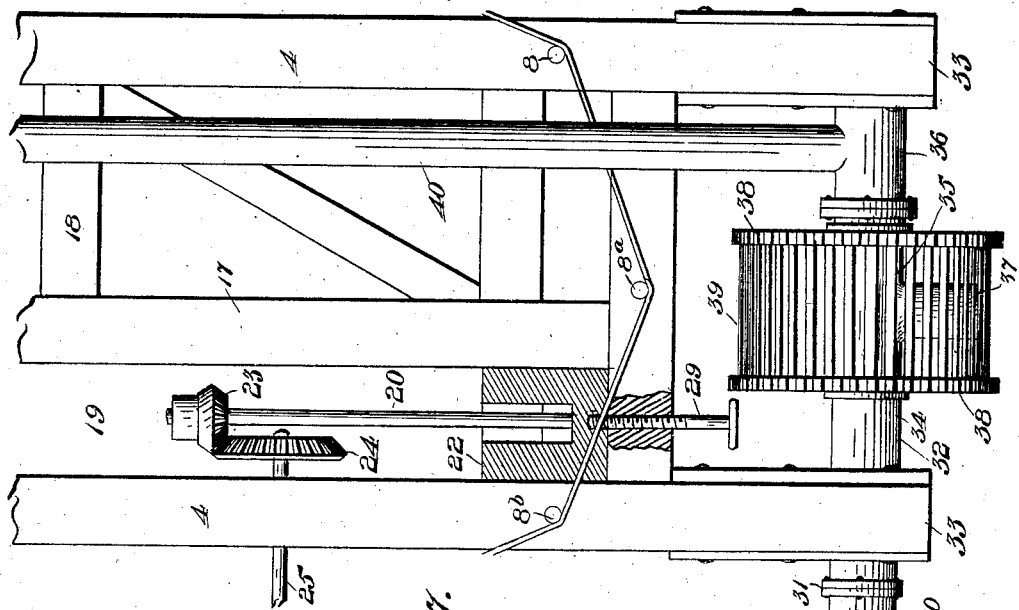
Witnesses.
B. M. Offutt.
May E. Moore.
Inventor
Henry B. Buddenborg
By David E. Moore
Attorney

UNITED STATES PATENT OFFICE.

HENRY B. BUDDENBORG, OF SEATTLE, WASHINGTON, ASSIGNOR OF ONE-HALF TO MARCELLUS LARA, OF SEATTLE, WASHINGTON.

DREDGING APPARATUS.

No. 845,689.　　　　　Specification of Letters Patent.　　　　　Patented Feb. 26, 1907.

Application filed August 10, 1904. Serial No. 220,212.

*To all whom it may concern:*

Be it known that I, HENRY B. BUDDENBORG, a citizen of the United States, residing at Seattle, in the county of King and State of Washington, have invented certain new and useful Improvements in Dredging Apparatus, of which the following is a specification.

My present invention relates to improvements in dredging apparatus, and has special reference to a machine for operating a suction device for receiving spoil containing fine particles in combination with an endless conveying bucket device for removing the spoil containing the larger particles, the said buckets being adapted to pass below and around the end of the suction-pipe so that the suction is drawn through the buckets, which retain the larger particles.

Another object of my invention is the provision of mechanism for operating both the suction and endless-chain bucket device simultaneously and means whereby the end of the suction-pipe and the endless chain are raised and lowered without effecting the operation of either mechanism.

I have found by experience that the ordinary suction dredging apparatus, although having an agitating mechanism, does not remove all the particles that it is desired to remove, and also that the pipe will often become clogged with large particles, the specific gravity of which will not allow them to pass through the pipe, and in order to raise these large particles it has been my object to produce a mechanism which when used in connection with the suction-pipe will raise all of the spoil to the surface, the smaller particles passing through the suction-pipe, while the larger particles are retained in the buckets and dumped at any desired point.

To attain these objects, the invention consists of a dredging apparatus embodying novel features of construction and combination of parts, substantially as disclosed herein.

Figure 1:
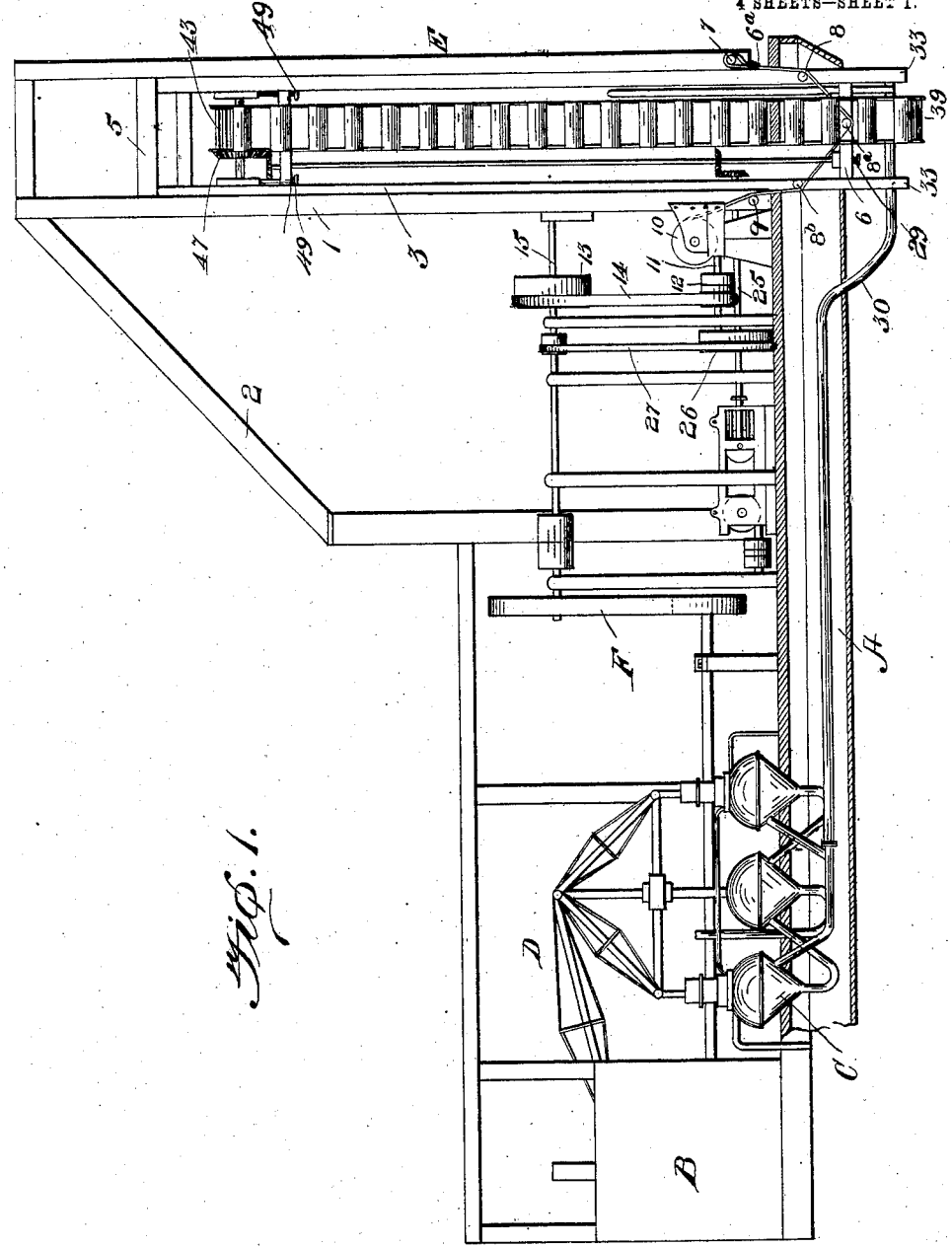
Figure 2:
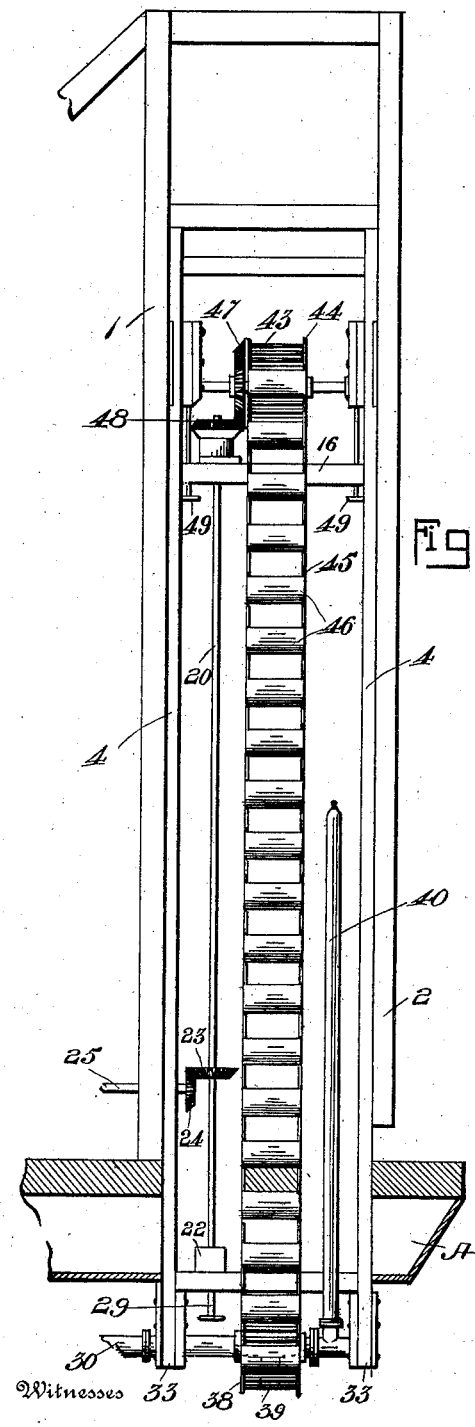
Figure 4:
Figure 3:
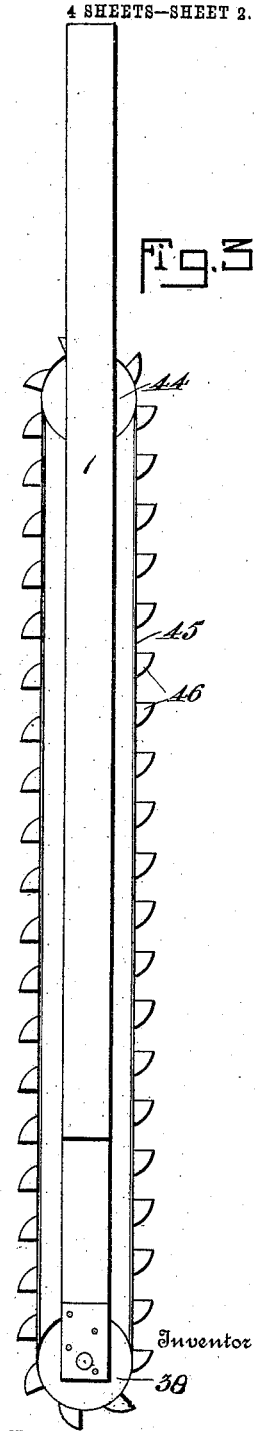

In the accompanying drawings, Figure 1 is a side elevation of a complete dredging mechanism constructed according to and embodying my invention. Fig. 2 is an enlarged detailed view of the sliding frame carrying the lower end of the suction-pipe and the endless-chain mechanism. Fig. 3 is a side elevation thereof. Fig. 4 is a detailed view of one side of the sliding frame removed. Fig. 5 is an enlarged detailed view of the suction end of the pipe, showing the vacuum stack thereof. Fig. 6 is a sectional view taken through the pipe and cage. Fig. 7 is an enlarged detailed view of the lower end of the vertical shaft for operating the endless chain and the means for raising and lowering the same. Fig. 8 is a similar view of the upper end of said shaft, showing its connection with the endless-chain-operating mechanism and the means for adjusting the slack of the chain. Fig. 9 is a perspective view of the revolving cage and a portion of the endless chain connected therewith.

Referring to the drawings, A designates a pontoon or scow upon which is mounted the boiler and engine B, which is operably connected to the suction-pumps C through the medium of the walking-beams D and with the endless-chain-operating mechanism E through the medium of the belt F, the said mechanism also operating the means for operating a sliding ladder hereinafter to be set forth.

Mounted at one end of the pontoon is a stationary vertically-disposed framework 1, which is properly braced by means of the inclined pieces 2, so as to be rigid with the pontoon. Mounted within said framework and vertically movable or slidable therein is a sliding frame 3, which consists of the two side pieces 4, upper cross-head 5, and lower cross-head 6. In order to raise and lower this frame within the stationary framework, I secure one end of a cable $6^a$ at 7 upon the stationary frame and pass it around pulleys 8, $8^a$, and $8^b$, secured, respectively, to the sides of the sliding frame and to the cross-head 6 over the pulley 9, secured to the opposite side of the stationary frame to the drum 10. This drum is operated upon by the shaft 11, whose pulleys 12 receive motion from the pulley 13. When it is desired to raise or lower the sliding frame, it is simply necessary to operate the belt 14 so that the same is not running on a loose pulley, so that power is transmitted, through the upper horizontal shaft 15, to the shaft 11, and consequently to the drum 10, thus pulling upon the cable $6^a$ and raising the sliding frame within the stationary frame. This sliding frame is further provided with a cross-head 16 and a vertical strip or piece 17, said piece 17 being secured between the crossheads 16 and 6, as clearly shown in Fig. 7, the brace-strips 18 being employed to give great strength to the structure. This construction provides a space 19 between the piece 17 and sides of the frame, the purpose of which is to allow for the journaling of the vertical shaft 20. This shaft is what I term a "key-slotted shaft," having its upper end mounted in the bearing 21 and its lower end in the sliding box 22, the purpose of which will presently appear. Slidingly mounted upon the shaft and adapted to revolve the same when it is revolved is a small beveled gear or miter wheel 23, the construction of which is clearly shown in Fig. 7. Adapted to operate upon this gear-wheel is a large beveled gear-wheel 24, which is mounted upon the shaft 25, which, through the medium of the pulleys 26 and belt 27, receives motion from the shaft 15, as clearly shown in Fig. 1. This shaft 25 is journaled in one side of the stationary frame and projects through the vertical slot 28, formed in the inner side 4 of the stationary frame, as clearly shown in Fig. 4. Passing through the cross-head 6 is an adjusting-screw 29, whose inner end is adapted to engage the lower side of the sliding box 22, the purpose of which will presently appear.

Connected to the suction-pumps and extending outwardly toward the stationary frame is the suction hose or pipe 30, whose lower end is connected by a coupling 31 to the pipe 32, mounted between the projecting ends 33 of the sliding frame. This suction-pipe consists practically of three sections 34, 35, and 36, the central section 35 being provided with the suction-mouth or intake-pipe 37 and has journaled thereon the two sprocket-wheels 38, which are secured together so as to revolve in unison and form a cage by means of the rods 39. These rods pass around and over the mouth of the intake-pipe so as to screen the larger particles and prevent them from passing into the suction hose or pipe.

In order to prevent any pulsation at the suction-mouth due to the alternating of the plungers of my suction-pipe and to insure a steady stream of water under the suction-mouth, I provide the vacuum pipe or chamber 40, which is secured to the upper portion of the section 36 and extends upward alongside and out of the way of the framework.

Mounted in the upper open space 41 of the sliding frame and in the bearings 42 is the upper drum 43, provided with sprocket-wheels 44, which aline with the sprocket-wheels 38 at the lower end of the sliding frame, so that the endless chains 45, carrying the scoop-buckets 46, will pass around the drum 43 and the rotatable cage at the lower end of the sliding frame and receive all of the larger particles that cannot be drawn through the suction-pipe and carry them to the upper end of the sliding frame and deposit them into a hopper. (Not shown.) Carried upon one side of the frame 43 is a beveled gear 47, which is adapted to mesh with the beveled pinion 48, carried upon the upper end of the shaft 20. By this means the shaft 20 conveys motion to the drum 43, which in turn operates the endless chains and bucket mechanism. In order to take up the slack in the chain, the screw 29 and screws 49 are brought into operation, the screw 29 operating upon the sliding box 22, while the screws 49 operate upon the sliding pieces 50, thus raising the drum 43 sufficiently to tighten the chain, while the screw 29 raised the sliding box 22, so as to properly keep the shaft 20 and its gear 21 in proper adjustment and engagement with the gear 47. As the screws 49 are operated to raise or lower the drum 43 the upper gear 48, carried by the rod 20, will be thrown out of engagement with the gear 47, and in order to do this I mount the lower end of the rod 20 in the sliding box 22, so that the screws 29 can be operated to raise or lower the box, and consequently the rod, thus always keeping the gears 47 and 48 in engagement and also at the same time keeping the endless chains properly adjusted.

From the foregoing description the operation of my improved dredging apparatus is fully understood and its numerous advantages fully appreciated, but briefly stated is as follows: The operating mechanism is set in motion after the sliding frame has been properly lowered in the position for acting upon the spoil at the bottom of a body of water. The mechanism for lowering the frame is disconnected and the mechanism for operating the suction-pumps and the endless chains are set in motion. The buckets carried by the endless chain agitate the spoil and carry it below the revolving cage which surrounds the intake pipe or mouth of the suction-pipe. By this means the smaller particles that can enter the cage are drawn through the suction-pipe and pumped to any desired place, while the endless chains with its buckets carries the larger particles which cannot enter the revolving screen to the upper end of the sliding frame and empty it into a hopper or any desired receptacle. Thus I provide a mechanism which is so constructed and arranged as to raise all of the spoil and at the same time not endanger the end of the suction-pipe with the large and hard particles.

This dredging apparatus is especially designed for mineral dredging, and for that reason can be well adapted for dredging channels or rivers and the like, as the substance handled at such places is much softer than in gold dredging.

What I claim as new, and desire to secure by Letters Patent, is—

1. In a dredging apparatus, the combination of an operating mechanism, a suction mechanism, a sliding frame carrying the lower end of the suction mechanism, and elevator mechanism passing around the lower end of the suction-pipe mounted in the sliding frame adapted to be operated simultaneously with the suction mechanism.

2. In a dredging apparatus, the combination of a frame, a sliding frame carried by said first-mentioned frame, a suction mechanism mounted in the lower end of said sliding frame, an elevator mechanism mounted upon said sliding frame, and passing around the lower end of the suction mechanism, and means adapted to operate said suction mechanism, elevator mechanism and sliding frame.

3. In a dredging apparatus, a combination of a frame, a suction-pipe, the lower end of which is connected to the frame, a revolving cage surrounding the lower end of the suction-pipe and adapted to prevent large particles from entering the same, an elevator mechanism mounted in the frame and passing around the revolving cage to revolve the same and elevate the larger particles, and mechanism for operating suction mechanism and elevator mechanism simultaneously.

4. In a dredging apparatus, the combination of a stationary frame, a sliding frame, a suction-pipe, the lower end of which is stationarily mounted in the lower end of said sliding frame and connected to the suction-pipe, a revolving cage mounted upon said stationary end of the suction-pipe and surrounding an elevator mechanism adapted to revolve around said cage, and mechanism for operating the suction mechanism and elevator mechanism simultaneously.

5. In a dredging apparatus, the combination of a scow or pontoon, a stationary frame carried thereby, another frame slidably mounted in said stationary frame, a suction mechanism having its lower end mounted in the lower end of the sliding frame, a revolving cage mounted upon the lower end of said suction mechanism and surrounding the intake-mouth thereof, said cage being provided with sprocket-teeth, a drum mounted in the upper end of the sliding frame and having sprocket-teeth in alinement with the sprocket-teeth of the cage, an endless chain adapted to pass around the cage and drum, buckets carried by said endless chain, and an operating mechanism mounted upon the scow and operably connected with the suction mechanism and endless chain mechanism.

6. In a dredging apparatus, the combination of a suction-pipe, a rotatable cage mounted upon said suction-pipe and surrounding the intake-mouth thereof, and a vacuum-chamber in communication with the suction-pipe beyond the intake-mouth thereof.

7. In a dredging apparatus, the combination of a sliding frame, a suction-pipe, the lower end of which is stationarily carried in the lower end of the sliding frame, said lower end being provided with a centrally-arranged intake-mouth, a rotatable screen or cage journaled upon the stationary pipe and surrounding the intake-mouth thereof, and a vacuum-chamber in communication with the suction-pipe beyond the intake-mouth thereof.

8. The combination with a dredging-machine, of a suction-pipe, and a vacuum-chamber beyond the intake-mouth thereof.

9. In combination with a dredging-machine, of a suction-pipe having a relatively stationary end, a screen rotatably mounted to surround the suction end of said pipe and prevent large particles from entering the same, and further provided with sprocket-teeth upon the rims thereof, and elevator mechanism for conveying larger particles for transmitting motion to the screen.

10. In a dredging apparatus, the combination of a stationary frame, another frame slidingly mounted within said stationary frame, a suction-pipe having its lower end mounted in the sliding frame, a rotatable screen surrounding the intake-mouth of the suction-pipe, an endless elevator mechanism surrounding said screen, a drum in the upper end of the sliding frame for transmitting motion to the elevator mechanism, a vertical shaft for operating upon said drum, means for raising the drum to take up the slack of the elevator mechanism, means for raising and lowering the vertical shaft, and mechanism for operating the suction mechanism and elevator mechanism simultaneously.

11. In a dredging mechanism, the combination of a scow, a stationary frame carried thereby, another frame slidingly mounted in said stationary frame, mechanism for raising and lowering said sliding frame, suction mechanism, a suction-pipe connected with the scow, a stationary pipe carried in the lower end of the sliding frame and connected to the suction-pipe, a rotating screen or cage mounted upon the stationary pipe, adjustable bearings mounted in the upper portion of the sliding frame, a drum mounted between said bearings, endless chains passing over said drum and revolving screen, a series of buckets carried by said chains, a vertical shaft adjustably mounted in the sliding frame, means for moving the bearings of the frame to take up the slack of the chains, means for operating the vertical shaft for keeping it in adjustment with the drum, and mechanism for operating said vertical shaft and the suction mechanism simultaneously.

12. In a dredging apparatus, the combination of a scow, a stationary frame, a sliding frame, a suction mechanism and an elevator mechanism carried by the sliding frame said elevator mechanism passing around the lower end of said suction mechanism, and means for operating said suction mechanism and elevator mechanism simultaneously carried by the scow.

13. In a dredging apparatus, the combination of a scow, a stationary frame, a sliding frame, a suction mechanism, an elevator mechanism carried by said sliding frame, said elevator mechanism passing around the lower end of said suction mechanism, mechanism for raising and lowering the sliding frame, and mechanism for operating the suction-pipe, elevator mechanism and raising and lowering mechanism.

14. The combination with a dredging-machine, of a suction-pipe the lower end of which is substantially T-shaped, the intake-mouth being the lower terminal, and a rotatable screen mounted upon the other terminal and surrounding the intake-mouth.

15. The combination with a dredging-machine, of a suction-pipe, the lower end of which is substantially T-shaped, the intake-mouth being the lower terminal, and a vacuum-chamber beyond the intake-mouth.

16. The combination with a dredging-machine, of a suction-pipe, the lower end of which is substantially T-shaped, the intake-mouth being the lower terminal, a rotatable screen mounted upon the other terminals and surrounding the intake-mouth, and a vacuum-chamber beyond the intake-mouth upon the opposite side therefrom.

17. The combination with a dredging-machine, of a suction-pipe, the lower end of which is substantially T-shaped, the intake-mouth being the lower terminal, a rotatable screen mounted upon the other terminals and surrounding the intake-mouth, and a vacuum-chamber beyond the intake-mouth.

18. The combination with a dredging-machine, of a suction-pipe, the lower end of which is substantially T-shaped, the intake-mouth being the lower terminal, and an elevator mechanism for removing larger particles.

19. The combination with a dredging-machine, of a suction-pipe, the lower end of which is substantially T-shaped, the intake-mouth being the lower terminal, a rotatable screen mounted upon the other terminals and surrounding the intake-mouth, and an elevator mechanism for removing larger particles passing over said screen.

20. The combination with a dredging-machine, of a suction-pipe, the lower end of which is substantially T-shaped, the intake-mouth being the lower terminal, a vacuum-chamber beyond the intake-mouth, and an elevator mechanism for removing large particles.

21. The combination with a dredging-machine, of a suction-pipe, the lower end of which is substantially T-shaped, the intake-mouth being the lower terminal, a rotatable screen mounted upon the other terminals and surrounding the intake-mouth, a vacuum-chamber beyond the intake-mouth, and an elevator mechanism for removing larger particles passing over said screen.

22. The combination with a dredging-machine, of a suction-pipe, the lower end of which is substantially T-shaped, the intake-mouth being the lower terminal a vacuum-chamber beyond the intake-mouth, and an elevator mechanism for removing large particles.

23. The combination with a dredging-machine, of a suction-pipe, the lower end of which is substantially T-shaped, the intake-mouth being the lower terminal, a rotatable screen mounted upon the other terminals and surrounding the intake-mouth, a vacuum-chamber beyond the intake-mouth, and an elevator mechanism for removing larger particles passing over said screen.

24. In a dredging apparatus, the combination of a suction-pipe, the lower end of which is adapted to lie substantially horizontal with the bed of the river, having a centrally-arranged downwardly-projecting intake-mouth, a screen rotatably mounted upon the horizontal portion and surrounding the intake-mouth, a drum mounted above said screen and in alinement therewith, and an elevator mechanism for removing larger particles passing around said drum and screen.

25. In a dredging apparatus, the combination of a suction-pipe, the lower end of which is adapted to lie horizontally with the bed of the river having a centrally-arranged downwardly-projecting intake-mouth, a screen rotatably mounted upon the horizontal portion and surrounding the intake-mouth, a drum mounted above said screen and in alinement therewith, and a pair of endless chains carrying elevating means for removing larger particles passing around said drum and screen, and mechanism for operating the suction-pipe and endless chains.

26. In a dredging apparatus, the combination of a sliding frame, mechanism for removing the fine particles located in the lower end of said sliding frame, mechanism for removing the coarser particles passing around the lower end of said first-mentioned mechanism, and mechanism for operating both of said mechanisms.

27. In a dredging apparatus, the combination of a sliding frame, mechanism for removing fine particles, a revolving screening means surrounding the lower end of said mechanism, and mechanism for removing coarser particles passing around said screening means and the lower end of the first mechanism.

28. In a dredging-machine, the combination of an operating mechanism, a suction mechanism, screening means mounted upon the lower end of the suction mechanism, and an endless conveying mechanism passing around the screening means and the lower end of the suction mechanism, whereby the suction mechanism will convey fine particles, while the endless conveying mechanism conveys larger particles.

29. In a dredging apparatus, the combination of a sliding frame, a suction mechanism, the lower end of which is mounted in the lower end of the sliding frame, an elevator mechanism mounted around the lower end of the suction mechanism and in the upper portion of the sliding frame, means for transmitting motion to the upper end of the elevator mechanism, mechanism for adjusting the elevator mechanism, and mechanism for adjusting the operating mechanism.

In testimony whereof I affix my signature in presence of two witnesses.

HENRY B. BUDDENBORG.

Witnesses:
JOHN PETERSON,
MARCELLUS LARA.